United States Patent
Breaux et al.

(10) Patent No.: US 10,408,053 B2
(45) Date of Patent: Sep. 10, 2019

(54) ENCAPSULATED PHASED ARRAY SEGMENT FOR DOWNHOLE APPLICATIONS

(71) Applicant: BAKER HUGHES INCORPORATED, Houston, TX (US)

(72) Inventors: Brian Breaux, Houston, TX (US); James V. Leggett, III, Magnolia, TX (US); Steffen Toscher, Lueneburg (DE); Roger Steinsiek, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 82 days.

(21) Appl. No.: 15/159,701

(22) Filed: May 19, 2016

(65) Prior Publication Data
US 2017/0335685 A1 Nov. 23, 2017

(51) Int. Cl.
*G01V 1/40* (2006.01)
*G01V 1/44* (2006.01)
(Continued)

(52) U.S. Cl.
CPC ............ *E21B 49/00* (2013.01); *E21B 47/082* (2013.01); *G01V 1/40* (2013.01); *G01V 1/44* (2013.01);
(Continued)

(58) Field of Classification Search
CPC ... G01V 1/40; G01V 1/44; G01V 1/52; G01V 2001/526; E21B 49/00
(Continued)

(56) References Cited

U.S. PATENT DOCUMENTS

| 5,541,889 A | 7/1996 | Priest et al. |
| 9,103,196 B2 | 8/2015 | Zhao et al. |

(Continued)

FOREIGN PATENT DOCUMENTS

| WO | 03/083466 A2 | 10/2003 |
| WO | 2015148261 A1 | 10/2015 |

OTHER PUBLICATIONS

Satyanarayan, C. et al., "Simulation of Ultrasonic Phased Array Technique for Imaging and Sizing of Defects Using Longitudinal Waves," In'l Jnl of Pressure Vessels & Piping 84, pp. 716-729 (2007).
(Continued)

*Primary Examiner* — Ian J Lobo
(74) *Attorney, Agent, or Firm* — Mossman, Kumar & Tyler, P.C.

(57) ABSTRACT

Systems, devices, and methods for estimating a value of a parameter of interest of an earth formation intersected by a borehole. Methods include conveying a carrier in the borehole having disposed thereon an acoustic imaging tool including at least one convex linear phased array module, each of the at least one module comprising a rigid shell forming a compartment containing a piezoelectric component array; using the acoustic imaging tool to take acoustic measurements of the borehole; and using the acoustic measurements to estimate at least one parameter of interest. Each module may be self-contained. The tool may include a plurality of modules circumferentially arrayed about a portion of the acoustic tool. Methods include individually removing one selected module from the acoustic tool. Methods may include selecting an outer tool diameter the same as an inner borehole diameter borehole and selecting a maximum number of modules fitting the outer tool diameter.

11 Claims, 11 Drawing Sheets

(51) Int. Cl.
*G01V 1/52* (2006.01)
*E21B 49/00* (2006.01)
*E21B 47/08* (2012.01)
*E21B 47/00* (2012.01)
*G01V 1/02* (2006.01)

(52) U.S. Cl.
CPC ............ *G01V 1/52* (2013.01); *E21B 47/0002* (2013.01); *E21B 47/0005* (2013.01); *G01V 1/159* (2013.01); *G01V 2001/526* (2013.01)

(58) Field of Classification Search
USPC ............................... 367/25, 69; 181/102, 105
See application file for complete search history.

(56) References Cited

U.S. PATENT DOCUMENTS

| | | | | |
|---|---|---|---|---|
| 9,720,121 B2* | 8/2017 | Zhou | ........................ | G01V 1/44 |
| 2005/0152219 A1* | 7/2005 | Garcia-Osuna | ....... | E21B 47/011 |
| | | | | 367/25 |
| 2011/0080806 A1* | 4/2011 | Normann | ................. | G01V 1/46 |
| | | | | 367/35 |
| 2011/0222369 A1 | 9/2011 | Difoggio et al. | | |
| 2012/0033528 A1* | 2/2012 | Zhao | .................... | E21B 47/082 |
| | | | | 367/28 |
| 2013/0239673 A1 | 9/2013 | Garcia Osuna et al. | | |
| 2014/0177388 A1* | 6/2014 | D'Angelo | ........... | E21B 47/0002 |
| | | | | 367/35 |
| 2014/0313855 A1 | 10/2014 | Cavender et al. | | |
| 2015/0204993 A1 | 7/2015 | Leggett, III et al. | | |
| 2016/0281501 A1* | 9/2016 | Bin Muhammad Moizuddin ....... | | |
| | | | | E21B 23/01 |
| 2017/0211381 A1* | 7/2017 | Chemali | ............. | E21B 47/0002 |

OTHER PUBLICATIONS

PCT/US2017/033352—International Search Report dated Aug. 21, 2017.

* cited by examiner

ENCAPSULATED PHASED ARRAY SEGMENT FOR DOWNHOLE APPLICATIONS

FIELD OF THE DISCLOSURE

The present disclosure is related to the field of investigating boreholes with electric wireline tools and Logging While Drilling (LWD) tools. More specifically, the present disclosure is related to the use of acoustic pulse-echo imaging tools, and processing data acquired with acoustic imaging tools to estimate parameters of the borehole and/or the earth formation.

BACKGROUND OF THE DISCLOSURE

Acoustic pulse-echo imaging tools are known in the art. The acoustic pulse-echo imaging tool usually comprises a rotating head on which is mounted a piezoelectric element transducer. The transducer periodically emits an acoustic energy pulse on command from a controller circuit in the tool. After emission of the acoustic energy pulse, the transducer can be connected to a receiving circuit, generally located in the tool, for measuring a returning echo of the previously emitted acoustic pulse which is reflected off the borehole wall. By processing the reflected signal, it is possible to infer something about the acoustic impedance characterizing the near-borehole environment. Specifically, changes in acoustic impedance are diagnostic of the geometry of the borehole.

SUMMARY OF THE DISCLOSURE

In aspects, the present disclosure generally relate to performing borehole logging operations. More specifically, the present disclosure is related to the use of acoustic pulse-echo imaging tools, and processing data acquired with acoustic imaging tools to estimate parameters of the borehole and/or the earth formation.

Aspects of the disclosure include methods for estimating a value of a parameter of interest of an earth formation intersected by a borehole. Methods may include conveying a carrier in the borehole, the carrier having disposed thereon an acoustic imaging tool including at least one convex linear phased array module, each of the at least one module comprising a rigid shell forming a compartment containing a piezoelectric component array; using the acoustic imaging tool to take acoustic measurements of the borehole; and using the acoustic measurements to estimate at least one parameter of interest. The at least one convex linear phased array module may be self-contained. Some embodiments may include only a single module.

In others, the acoustic imaging tool includes a plurality of self-contained convex linear phased array modules circumferentially arrayed about a portion of the acoustic tool. Each self-contained convex linear phased array module of the plurality may have identical dimensions. Methods may include individually removing one selected self-contained convex linear phased array module from the acoustic tool.

Methods may include using the plurality of self-contained convex linear phased array modules to make a continuous measurement around the circumference of the tool. Methods may include selecting an outer tool diameter substantially the same as an inner diameter of the borehole; selecting a maximum number of self-contained convex linear phased array modules fitting the outer tool diameter for the plurality, wherein the acoustic tool is configured to have the outer tool diameter and to accept the maximum number of self-contained convex linear phased array modules; and installing the plurality of self-contained convex linear phased array modules on the acoustic imaging tool. Methods may include bolting the plurality of self-contained convex linear phased array modules to the acoustic tool.

The acoustic imaging tool may be controlled by at least one processor configured to be switchable between a plurality of modes. Each mode of the plurality of modes may correspond to a particular number of self-contained convex linear phased array modules being in the plurality of self-contained convex linear phased array modules. Methods may include switching the at least one processor into a mode of the plurality of modes corresponding to the maximum number.

Each convex linear phased array module of the plurality may be encapsulated. Each convex linear phased array module of the plurality may be encapsulated at least in part by the rigid shell. A borehole fluid may fill the borehole and at least a portion of the rigid shell may be in contact with the borehole fluid while using the acoustic imaging tool to take the acoustic measurements.

Each convex linear phased array module may include a sealed connective protuberance (e.g., boss), and each array segment may be electrically connected to the acoustic tool via the sealed connective protuberance. Each piezoelectric component array may comprise a plurality of piezoelectric elements, and the method may include initiating transmission from each piezoelectric element of the plurality of piezoelectric elements in a selected convex linear phased array module at a time different than other times corresponding to transmission by other piezoelectric elements of the plurality of piezoelectric elements. Transmission from each piezoelectric element may be initiated with a delay in accordance with a delay law to effect beam steering and/or focal depth. The at least one convex linear phased array module may be configured to prevent propagation of circumferential lamb waves on the module.

In other aspects, the present disclosure includes apparatus comprising: a convex linear phased array module comprising a rigid shell forming a compartment containing a piezoelectric component array. The apparatus may include a carrier conveyable in the borehole, the carrier having disposed thereon an acoustic imaging tool including the self-contained convex linear phased array module; and a processor configured to: use the acoustic imaging tool to take acoustic measurements of the borehole; and use the acoustic measurements to estimate at least one parameter of interest.

The acoustic imaging tool may include a plurality of convex linear phased array modules, including the convex linear phased array module, circumferentially arrayed about a portion of the acoustic tool. Each convex linear phased array module of the plurality may have identical dimensions. Each module of the plurality of convex linear phased array modules may be self-contained.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
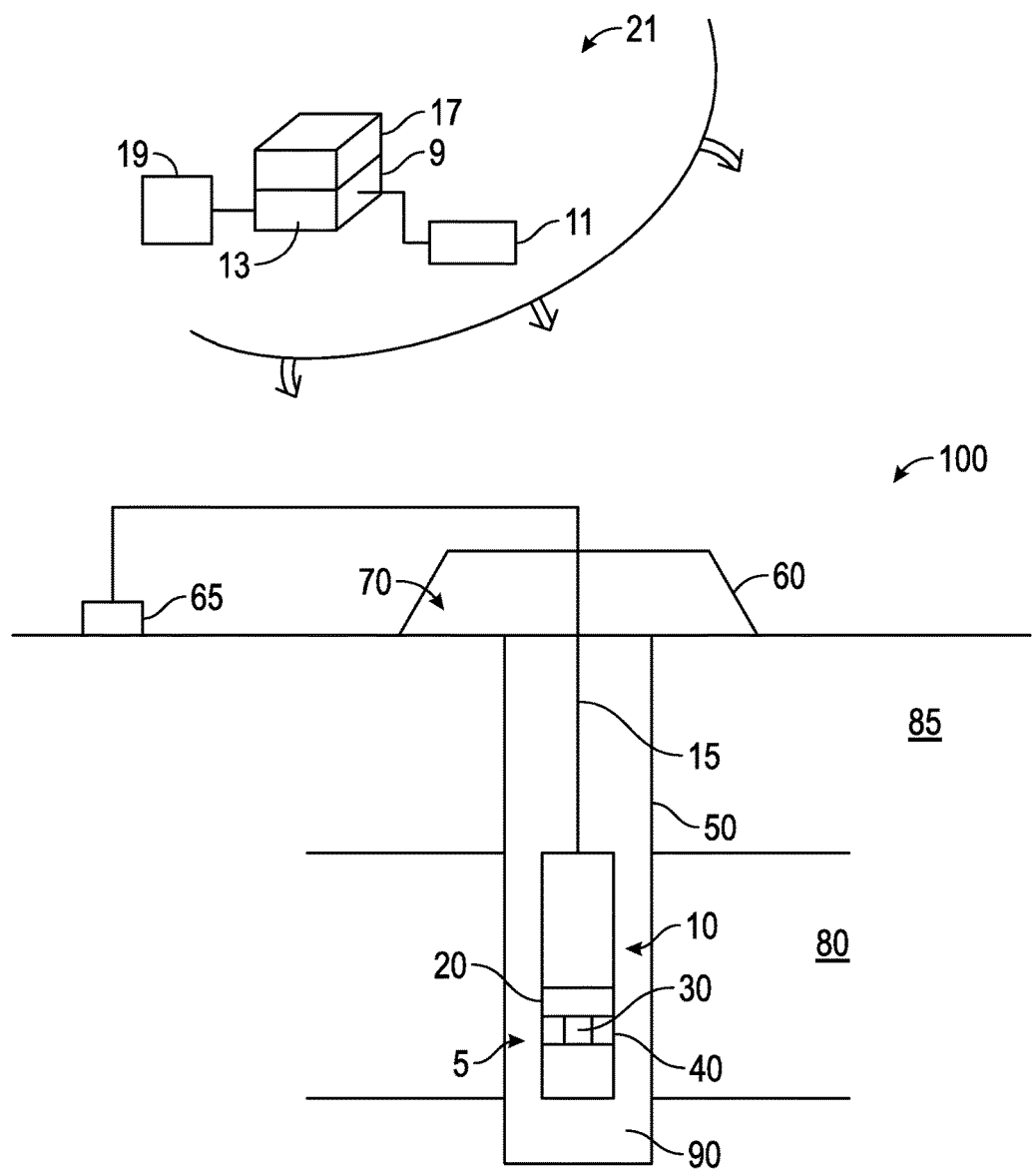
FIG. 1A schematically illustrates a downhole acoustic logging system in accordance with embodiments of the present disclosure.

The present disclosure generally relates to servicing boreholes with electric wireline tools and Logging While Drilling (LWD) tools. In one aspect, the present disclosure relates to estimating borehole parameters, such as, but not limited to, (i) size, (ii) shape, (iii) acoustic reflection strength, (iv) acoustic contrast of borehole fluid versus the earth formation, and (v) geometry. In another aspect, the present disclosure relates to generating images of the borehole wall, including, but not limited to, at least one of: (i) a stacked image and (ii) a borehole wall image over an aperture defined by a plurality of acoustic pulses. In another aspect, the present disclosure relates to an apparatus for estimating at least one property of a borehole wall and/or an earth formation using overlapping acoustic events, wherein the events may include acoustic pulses and acoustic reflections.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Acoustic phased transducer arrays are known which are composed of several piezoelectric elements that can transmit or receive independently at different times, and which enable focusing of the ultrasonic beam by the use of time delays applied to the elements to create constructive interference of the wavefronts. This technique allows acoustic energy to be focused at any depth in the test specimen undergoing inspection. Ultrasonic data may be generated by constructive phasal interference formed by multiple elements controlled by time delayed pulses. The arrays can perform beam sweeping through an angular range (S-scans), beam scanning at fixed angle (E-scans), beam focusing, lateral scanning and a variety of other scans depending on configuration. See G. Neau and D. Hopkins. The promise of ultrasonic phased arrays and the role of modeling in specifying systems, *Proc. ASNT Fall Conference & Quality Testing Show*, Houston, 2006.

Implementing a phased array transducer system for downhole use is very challenging due to required precision and material composition. In one example, the array encircles the diameter of the tool and is composed of large numbers (e.g., 60 to 200 or more) of individual transducer elements (e.g., piezoelectric crystals). These elements must be precisely spaced and shielded from exposure to mud and debris present in the borehole in order to avoid damage (which could be chemical or physical in nature), particularly during drilling operations. For example, conventional piezoelectric transducer design features backing material composed of an elastomer impregnated with, for example, tungsten particles. For a circumferential array, backing material of approximately 1 inch in radial thickness would be necessary, which would result in little stiffness but an elevated mass density. These characteristics yield an exaggerated dynamic response when the array system is exposed to random vibration or sudden shock. The bond between piezoelectric crystals and backing material is critical to the function of the array and any de-lamination would cause the affected elements to fail in performing their intended transceiver function. Large displacement of the piezoelectric elements relative to the backing material will place large strain on the bond between these two components, likely resulting in failure. Adding to the complication, additional components may be present in the array to provide mounting, isolation, enhancement of signal transference and electrical connectivity. Aspects of the present disclosure solve these difficulties by subdividing the circumferential array into segments or groups of transducer elements. These segments may be structurally enhanced, such as, for example, being housed in a rigid shell and/or being encapsulated, along with additional components needed to facilitate the array segment's function.

General method embodiments may include conveying a carrier in the borehole, the carrier having disposed thereon an acoustic imaging tool including at least one self-contained convex linear phased array module, each of the at least one module comprising a rigid shell forming a compartment containing a piezoelectric component array; using the acoustic imaging tool to take acoustic measurements of the borehole; and using the acoustic measurements to estimate at least one parameter of interest.

In aspects, the acoustic imaging tool includes a plurality of self-contained convex linear phased array modules circumferentially arrayed about a portion of the acoustic tool, wherein each self-contained convex linear phased array module of the plurality has identical dimensions. Thus, the array is modular in nature, and the modules are standardized to particular dimensions.

Method aspects may include selecting an outer tool diameter for the tool substantially the same as an inner diameter of the borehole in which the tool will be conveyed; selecting a maximum number of self-contained convex linear phased array modules fitting the outer tool diameter for the plurality, wherein the acoustic tool is configured to have the outer tool diameter and to accept the maximum number of self-contained convex linear phased array modules; and installing the plurality of self-contained convex linear phased array modules on the acoustic imaging tool. Thus, an optimal number of modules, such as, for example, the maximum number of modules fitting the outer tool diameter, may be selected for use on the tool. The plurality of self-contained convex linear phased array modules may be used to make a continuous measurement around the circumference of the tool. Gaps between modules may be covered by scanning the borehole portion corresponding to the gap by beam steering.

Embodiments may include using at least one acoustic sensor to produce acoustic information responsive to an acoustic wave from the earth formation. The sensor may include at least one acoustic transmitter and at least one acoustic receiver, which may be implemented as at least one self-contained convex linear phased array module, and which may be implemented as the same module serving as both the transmitter and the receiver. The information is indicative of a parameter of interest. The term "information" as used herein includes any form of information (analog, digital, EM, printed, etc.), and may include one or more of: raw data, processed data, and signals.

Methods may include estimating a parameter of interest from the information, evaluating the formation using the parameter of interest, and/or performing further borehole or formation operations in dependence upon the evaluation or the parameter of interest. In particular embodiments, a state of drilling operations, characteristics of the borehole or formation, or orientation of components of the downhole tool may be estimated using the parameter of interest, and then used in performing an operation as described above.

FIG. 1A schematically illustrates a downhole acoustic logging system 100 having a downhole tool 10 configured to acquire information using a sensor 5, comprising at least one self-contained convex linear phased array module 30 serving as acoustic transmitter and acoustic receiver, while in a borehole 50 in an earth formation 85 and estimate a parameter of interest of a volume of interest 80 of the formation 85.

The sensor 5 may include a plurality of self-contained convex linear phased array module 30 in an azimuthal array 40 about the circumference of the tool capable of sending acoustic pulses to and receiving signals from a plurality of azimuthal orientations via the use of beam-forming.

The system 100 may include a conventional derrick 60 erected on a derrick floor 70. A conveyance device (carrier 15) which may be rigid or non-rigid, may be configured to convey the downhole tool 10 in the wellbore 50 intersecting the earth formation 80. Drilling fluid ('mud') 90 may be present in the borehole 50. The carrier 15 may be a drill string, coiled tubing, a slickline, an e-line, a wireline, etc. Downhole tool 10 may be coupled or combined with additional tools, including, e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable). The carrier 15 may include a bottom hole assembly, which may include a drilling motor for rotating a drill bit.

A surface control system 65 receives signals from downhole sensor 5 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 20 at a suitable location on downhole tool 10. The surface control system 65 may process data relating to the operations and data from the sensor 5, and may control one or more downhole operations performed by system 100.

In one embodiment, electronics associated with sensors 40 may be configured to record and/or process the information obtained. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, circuitry associated with the sensor 5 (described in further detail below with respect to FIG. 2) may be configured to take measurements at a plurality of azimuthal orientations as the tool moves along the longitudinal axis of the borehole ('axially') using sensor 5. These measurements may be substantially continuous, which may be defined as being repeated at very small increments of depth and azimuth, such that the resulting information has sufficient scope and resolution to provide an image of borehole parameters (e.g., acoustic properties of the formation at the borehole).

In other embodiments, circuitry may be located elsewhere (e.g., at the surface, or remotely). To perform the treatments during a single trip, the tool may use a high bandwidth transmission to transmit the information acquired by sensor 5 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "substantially real-time."

One point of novelty of the system illustrated in FIG. 1A is that the at least one processor may be configured to perform certain methods (discussed below) that are not in the prior art. A surface control system or downhole control system may be configured to control the tool described above and any incorporated sensors and to estimate a parameter of interest according to methods described herein.

Figure 1B:
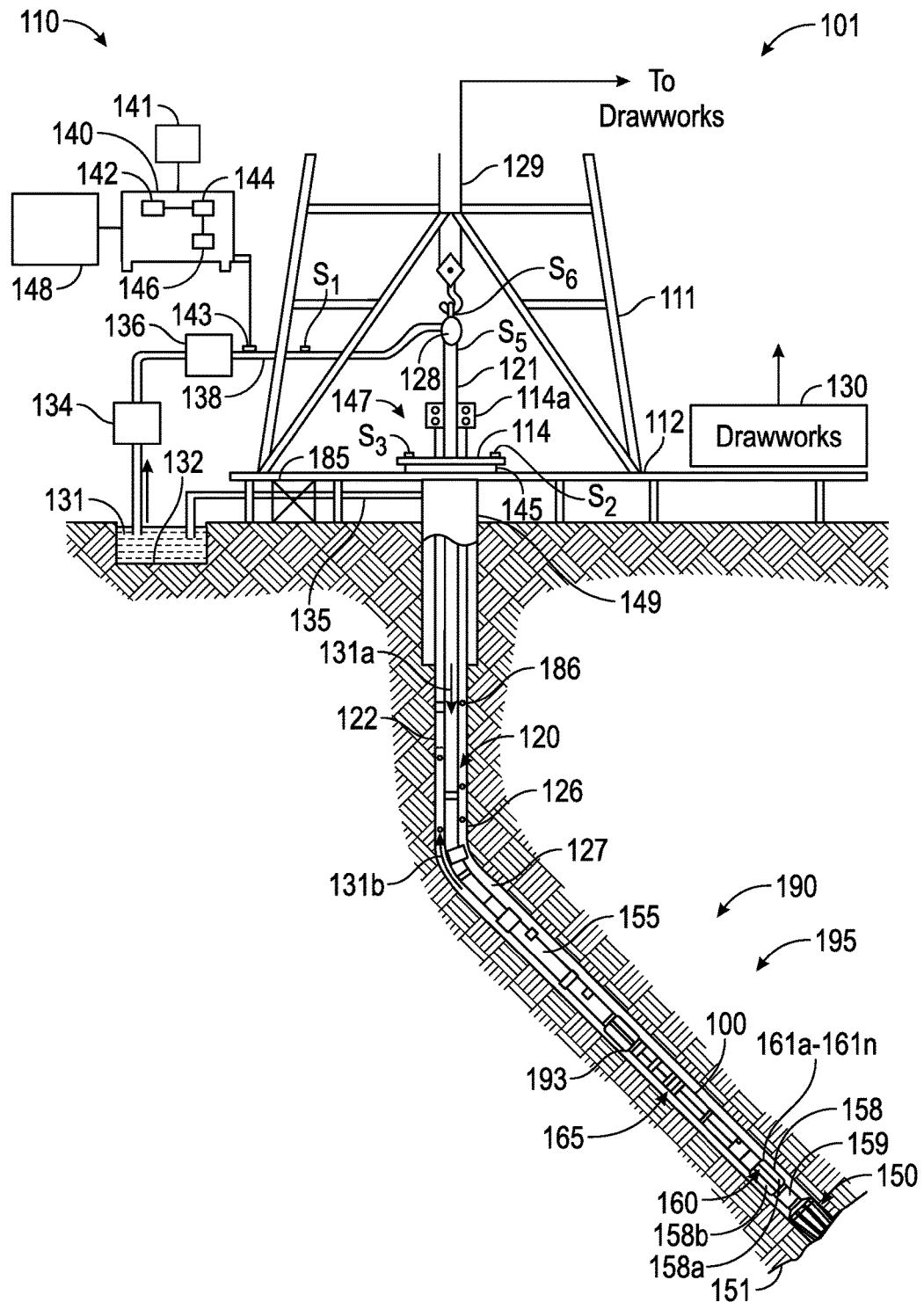
FIG. 1B is a schematic diagram of an exemplary drilling system according to one embodiment of the disclosure.

Aspects of the present disclosure are subject to application in various different embodiments. In some general embodiments, carrier 15 is implemented as a tool string of a drilling system, and the acoustic wellbore logging may be characterized as "logging-while-drilling" (LWD) or "measurement-while-drilling" (MWD) operations. FIG. 1B shows an exemplary embodiment of a system for evaluation of an earth formation using measurements from an acoustic logging system. The system 101 includes a carrier 111 that is shown disposed in a wellbore or borehole 126 that penetrates at least one earth formation 195. The system 101 also includes a tool 110 configured for taking acoustic measurements in the borehole.

As described herein, "borehole" or "wellbore" refers to a single hole that makes up all or part of a drilled well. Depending on the configuration, the system 101 may be used during drilling and/or after the wellbore 112 has been formed, including, in some instances after the installation of casing or production infrastructure. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

FIG. 1B is a schematic diagram of an exemplary drilling system 101 according to one embodiment of the disclosure. FIG. 1B shows a drill string 120 that includes a bottomhole assembly (BHA) 190 conveyed in a borehole 126. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

Well control system 147 is placed at the top end of the borehole 126. The well control system 147 includes a surface blow-out-preventer (BOP) stack 115 and a surface choke 149 in communication with a wellbore annulus 127. The surface choke 149 can control the flow of fluid out of the borehole 126 to provide a back pressure as needed to control the well.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165, and include counterparts to the sensor(s) 5 described above with respect to FIG. 1A. The BHA 190 may further include a variety of other sensors and devices 159 for determining one or more properties of the BHA 190 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.). For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158a to orient the bent sub in the wellbore and the second steering device 158b to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 190 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. While a drill string 120 is shown as a conveyance device for sensors 165, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 101 may include a bottomhole assembly and/or sensors and equipment for implementation of embodiments of the present disclosure on either a drill string or a wireline.

A point of novelty of the system illustrated in FIG. 1B is that the surface processor 142 and/or the downhole processor 193 are configured to perform certain methods (discussed below) that are not in the prior art. Surface processor 142 or downhole processor 193 may be configured to control mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling paramaters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 142, downhole processor 193, or other processors (e.g. remote processors) may be configured to use at least one sensor to produce a corresponding signal, responsive in part to a reflection of an emitted wave, from each of a plurality of azimuthally distributed orientations about a BHA. In some general embodiments, surface processor 142, downhole processor 193, or other processors (e.g. remote processors) may be configured to operate the tool 101 to excite and measure acoustic signals.

At least one processor of the tool may be configured to be switchable between a plurality of modes, wherein each mode of the plurality of modes corresponds to a particular number of self-contained convex linear phased array modules being in the plurality of self-contained convex linear phased array module—that is, each mode depends on the number of modules in the array on the tool. Methods may include switching the at least one processor into the appropriate mode prior to use. In some implementations, the at least one processor may be configured to automatically detect the number of modules and switch to the appropriate mode for the particular configuration in accordance with plug-and-play protocols.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Figure 2A:
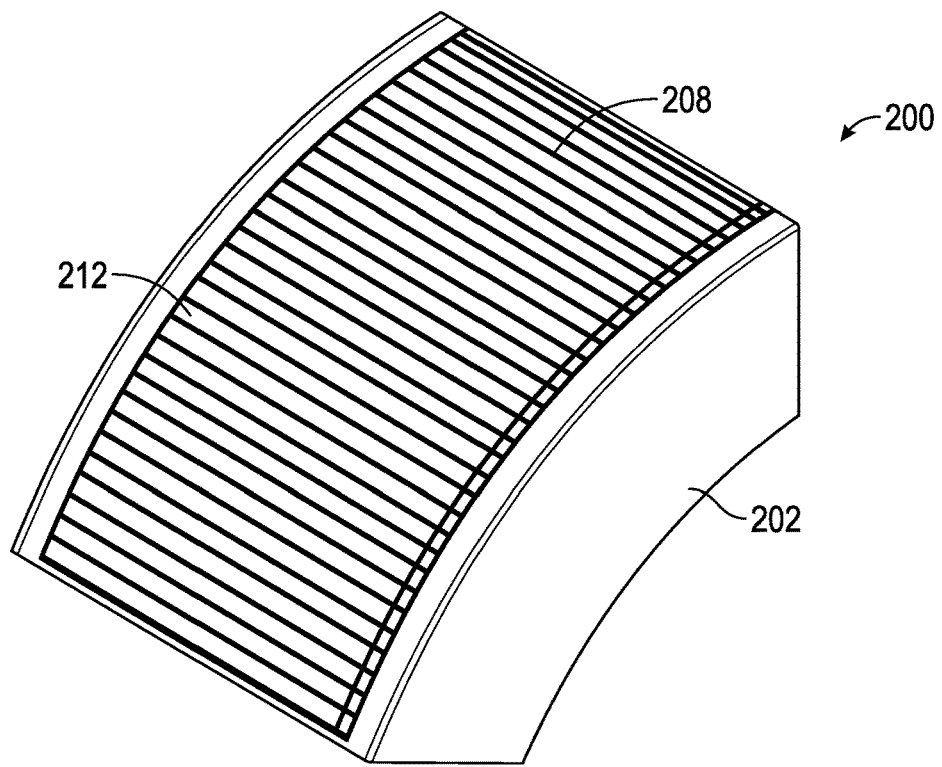
FIG. 2A illustrates a self-contained convex linear phased array module in accordance with embodiments of the present disclosure.
Figure 2B:
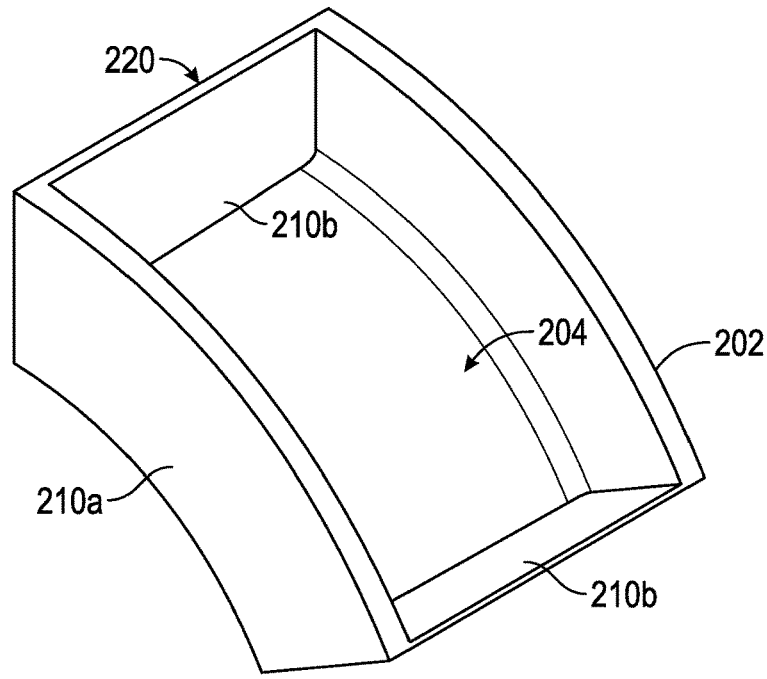
FIG. 2B shows a rigid shell forming a compartment for containing a piezoelectric component array in accordance with embodiments of the present disclosure.

FIG. 2A illustrates a self-contained convex linear phased array module in accordance with embodiments of the present disclosure. The self-contained convex linear phased array module 200 comprises a rigid shell 202 forming a compartment containing a piezoelectric component array 208. FIG. 2B shows the shell 202 alone, forming compartment 204. The rigid shell 202 may comprise a box or pan having an arched base. The shell 202 may have five surfaces (walls) 210, and may have one open or partially open side 220. The surfaces 210 may include a pair of arcuate walls coupled to the arched base.

The piezoelectric component array 208 comprises a plurality of piezoelectric elements 212 supported by backing material within the rigid shell. In one example, the backing material may be tungsten-loaded elastomeric material. The material may be constructed of a solid matrix, such as an epoxy or another polymer filled with solid fillers such as tungsten powder increasing total density, and tungsten particles, micro balloons, and so on acting as acoustic scatterers increasing attenuation. Backing materials that can be used in conjunction with acoustic transducers are not limited to the embodiments described herein. Any suitable backing material, matrix material, granular materials and combination thereof may be used for acoustic impedance. For example, porous materials such as fitted and/or voided metallic backing materials may be used. Other examples of backing materials that may be utilized in conjunction with transducers described herein include porous liquid-filled backings disclosed in US Patent Application No. 2011/0222369 to DiFoggio et al., having the same assignee as the present disclosure and the contents of which are incorporated herein by reference.

The piezoelectric elements 212 may be implemented as piezoelectric crystals, piezoelectric ceramics (e.g., monolithic ceramics), piezoelectric composites, and so on. The piezoelectric elements 212 may be bonded to the elastomeric material using an environmentally appropriate epoxy or polymer. The elements may be spaced apart, for example, at half-wavelengths on center. The piezoelectric component array 208 may comprise circuitry configured to independently transmit and receive acoustic signals from each of the piezoelectric elements 212. Thus, each piezoelectric component 212 can transmit/receive independently at different times. At least one processor may be configured to operate each individual piezoelectric element 212 separately, and may be configured to use the elements for variable focusing, beam steering, electronic scanning, and so on. To focus the ultrasonic beam, time delays are applied to the elements to create constructive interference of the wavefronts, allowing the energy to be focused at any depth in the volume being evaluated, as known in the art. The frequency of operation may be from 200 kHz to 1 MHz. In embodiments, a tool may include a plurality of self-contained convex linear phased array modules circumferentially arrayed about a portion of the acoustic tool as a segmented module array 230. It should be noted that each self-contained convex linear phased array module of the plurality has identical dimensions.

Figure 2C:
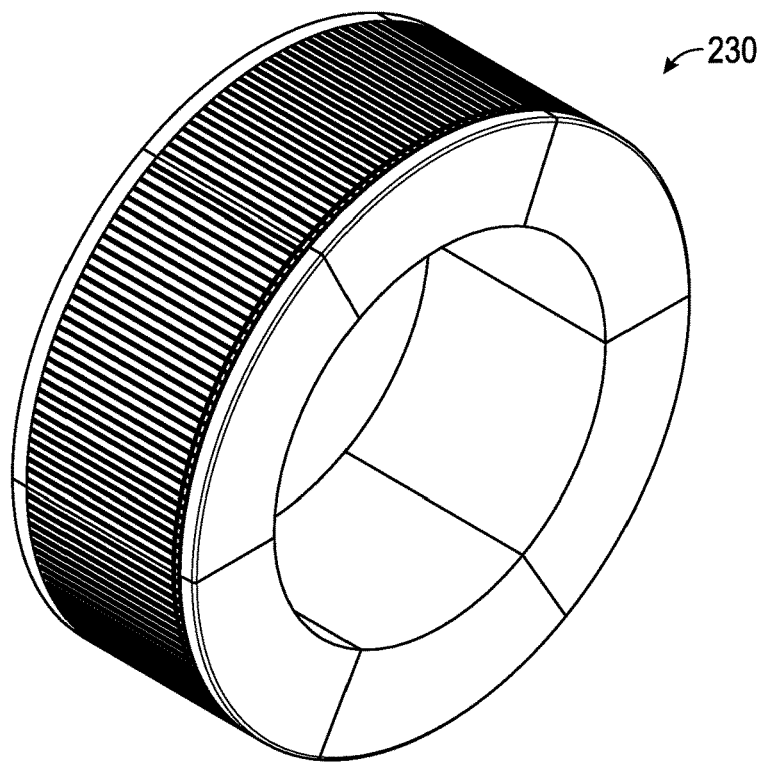
FIG. 2C illustrates a segmented module array made up of a number of identical self-contained convex linear phased array modules.

FIG. 2C illustrates a segmented module array 230 made up of a number of identical self-contained convex linear phased array modules 200. Referring back to FIG. 2B, sidewall 210a is arcuate, resulting in non-parallel end walls 210b. In some embodiments, end walls 210b of a module 200 may abut the end walls of adjacent modules. In other embodiments, the modules 200 of segmented module array 230 are spaced apart.

Each individual self-contained convex linear phased array module 200 comprises a lower mass than required for a unified array, in a much smaller space. Additionally, the elastomeric material is supported on several sides (e.g., two pairs of opposing sides) by a rigid material. As a result, each module 200, as well as the array 230, is configured to withstand extreme vibration and shock experienced during drilling operations.

Figure 3A:
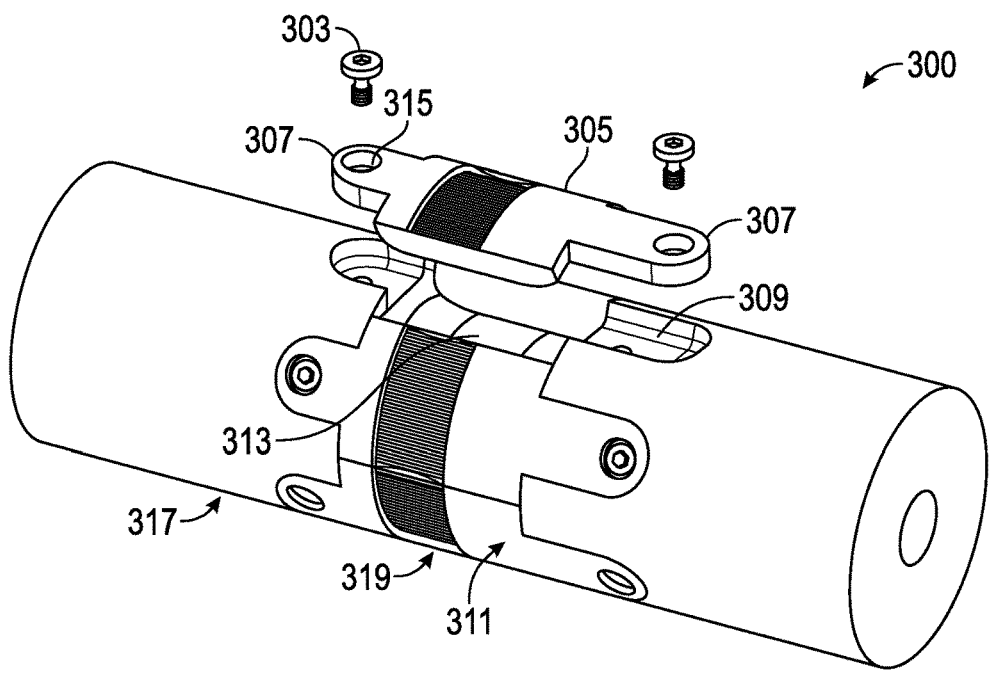
FIG. 3A shows a schematic diagram illustrating an example acoustic tool of the present disclosure.

FIG. 3A shows a schematic diagram illustrating an example acoustic tool 300 of the present disclosure. Acoustic tool 300 may be an imaging tool. The tool 300 may be disposed on a carrier 15 as described above with respect to FIG. 1A. Tool 300 comprises a plurality of self-contained convex linear phased array modules 311 circumferentially arrayed about a portion of the acoustic tool. The tool 300 comprises a unitary chassis 317 comprising neck 313 around which self-contained convex linear phased array modules 311 are arrayed in a segmented module array 319. The tool 300 features recesses 309 for receiving the plurality of self-contained convex linear phased array modules 311. Each self-contained convex linear phased array module 305 of the plurality has identical dimensions, and may be bolted on using at least one threaded fastener 303 projecting through bolt holes 315 in one or more asymmetric flanges 307, or otherwise removably fastened to the tool 300. Each module 305 may be independently removed from the acoustic tool 300.

Use of modules 311 allows a unitary chassis 317, which improves structural strength of the tool 300. Neck 313 may be contrasted with conventional transducer ring design, wherein the chassis must be separated into two components including a thin internal mandrel with a connecting joint smaller than the inner diameter of the array in order to facilitate assembly. Such a conventional design composed of a primary structural mechanical connection which is very small relative to the overall structure, and a threaded joint seating on an internal shoulder, results in an overall configuration which is very weak in terms of fatigue strength which is incompatible with drilling applications. Thus, use of segmented module array 319 has the advantage of avoiding a small internal mandrel to capture the array, and greatly increases the robustness of the tool.

Figure 3B:
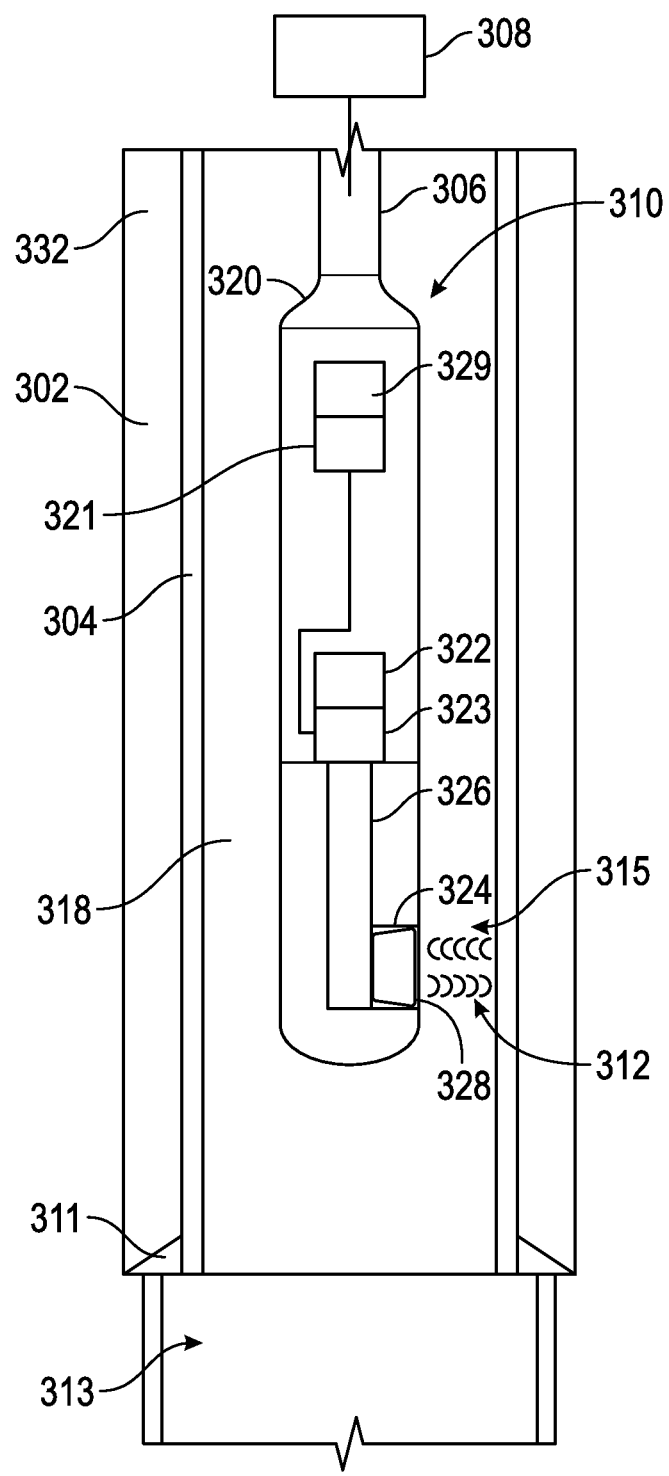
FIG. 3B shows an example tool in accordance with embodiments of the present disclosure.

FIG. 3B shows an example tool 210 of the present disclosure. The tool 310 may be connected to one end of a cable 306 and may comprise a housing 320 which contains a self-contained convex linear phased array module 324 on a mount 326 rotated by an electric motor 322. Rotation of the self-contained convex linear phased array module 324 may enable evaluation of substantially all the circumference of the borehole 302 and/or casing 304 by enabling acoustic pulses 312 to be aimed at and reflections 315 received from various angular positions around the axis of the borehole 302 and/or casing 304. The acoustic pulses 312 are generated, and the reflections 315 are received by a piezoelectric element 328 disposed on self-contained convex linear phased array module 324. Narrow beam width of the beams from the element 328 enables high resolution of small features in the borehole 302. The piezoelectric element 328 may emit the acoustic pulses 312 upon being energized by electrical impulses from transceiver circuitry 321. The electrical impulses are conducted through an electromagnetic coupling 323. After transmitting the acoustic pulse 312, the transceiver circuit 321 is programmed to receive a time-varying electrical voltage generated by the piezoelectric element 328 as a result of the reflections 315 striking the piezoelectric element 328. The tool 310 may also comprise additional processors 329 configured to conduct measurements with the tool 310 and transmit information to the surface logging unit 308 through the cable 306.

FIGS. 4A-4E illustrate example encapsulated self-contained convex linear phased array modules in accordance with embodiments of the present disclosure. Embodiments may include individually encapsulated self-contained convex linear phased array modules for each array segment. The encapsulation material (encapsulant) may be directly coupled to the piezoelectric elements, which improves acoustic transmission. The encapsulant also serves as a barrier protecting against mechanical impingement and contamination by drilling fluid. Encapsulation thus improves functionality and reliability.

Figure 4A:
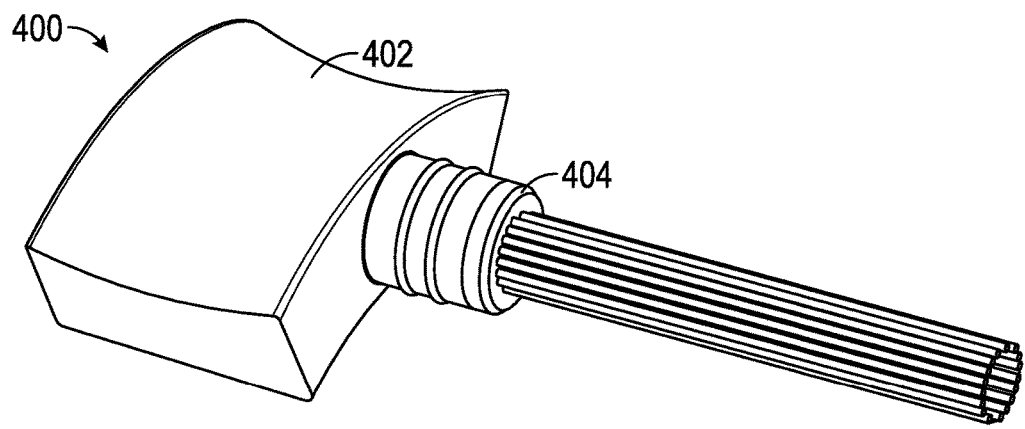
FIGS. 4A-4E illustrate example encapsulated self-contained convex linear phased array modules in accordance with embodiments of the present disclosure.
Figure 4B:
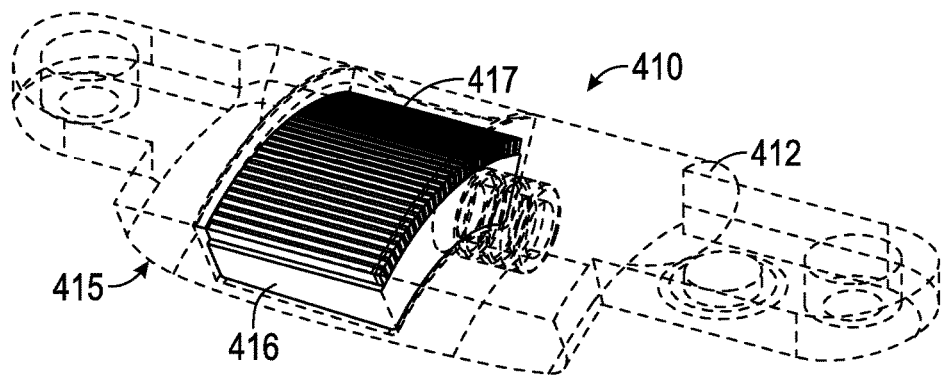
Figure 4C:
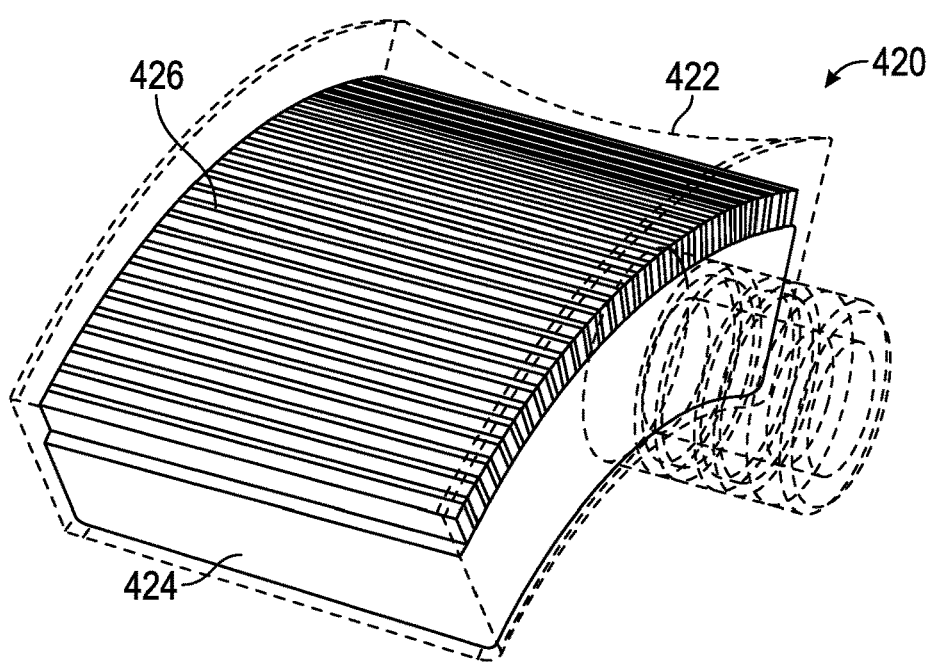
Figure 4D:
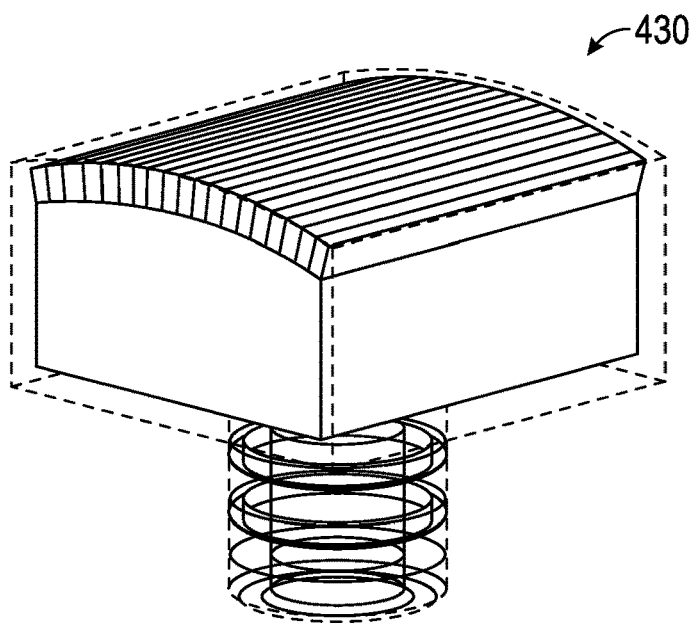
Figure 4E:
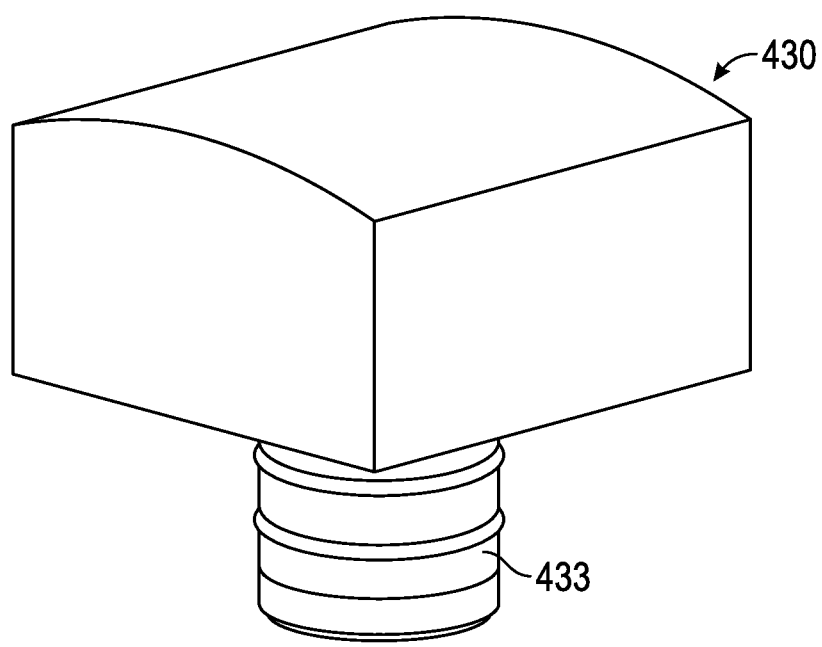

FIG. 4A shows a self-contained convex linear phased array module 400 covered by an encapsulant 402 formed to match an outer tool surface of the acoustic tool. Module 400 also includes a sealed boss 404 with protruding wires 406 for electrical connectivity. FIG. 4B shows a self-contained convex linear phased array module 410 encapsulated by encapsulant 412 formed as flanged self-contained convex linear phased array module 415 having a form factor of module 305. Encapsulant is depicted as transparent to facilitate understanding of the positioning of shell within encapsulant. Rigid shell 416 supports elastomeric material (not shown) backing piezoelectric elements 417. FIG. 4C shows a self-contained convex linear phased array module 420, wherein the encapsulant serves as the rigid shell 422, and is directly bonded with a portion of elastomeric material 424 and piezoelectric components 426 supported by elastomeric material 424. FIGS. 4D & 4E illustrate other examples of encapsulated self-contained convex linear phased array modules in accordance with embodiments of the present disclosure. Self-contained convex linear phased array module 430 of 4D & 4E include radially protruding boss 433.

Figure 5:
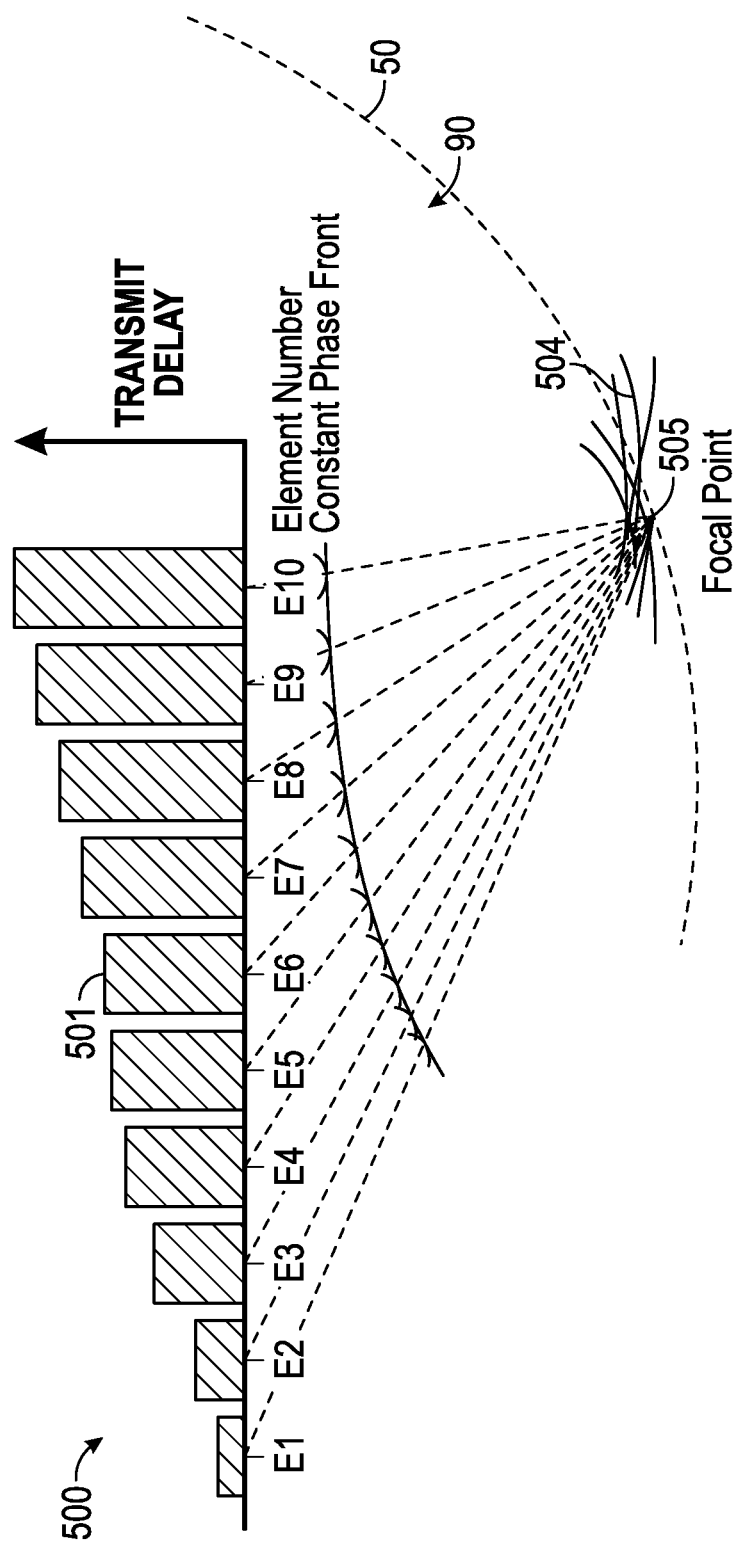
FIG. 5 shows the principle of operation of a self-contained convex linear phased array module in accordance with embodiments of the present disclosure.

FIG. 5 shows the principle of operation of a self-contained convex linear phased array module in more detail. As described above with respect to FIG. 1, the tool 10 may be suspended substantially in the center of the borehole 50 and surrounded by borehole fluid 90. Acoustic pulses emitted by the tool 10 may travel through the fluid 90 filling the borehole 50 until the acoustic pulses contact the borehole 50, or the casing or cement, depending on context and the tool focus. FIG. 5 illustrates a graphical depiction 500 of beam focusing using elements E1-E10 of the module. Each element radiates a spherical wave at a specified time. As described above, a position-dependent time delay 501 is applied to each of the piezoelectric elements E1-E10 of the self-contained convex linear phased array module to provide an acoustic beam with focal point 505. The time delays are applied to elements E1-E10 to create constructive interference of the wavefronts 504. The superposition of the wavelets initiated from different positions from different times may result in an almost planar wavefront at the specified location. The delays may be calculated according to well-known delay laws computed to focus the acoustic beam at a specified depth and angle. For example, $$t_n = (F/c)[[1 + (((N-1)/2)(d/F))^2 + (2((N-1)/2)d\sin\theta/F)]^{(1/2)} - [1 + ((n - ((N-1)/2 - 1)^*d/F)^2 - 2(n - ((N-1))/2d\sin\theta/F)]^{(1/2)}].$$

wherein F is the depth of focus, N is the total number of active elements, n is the element number, d is the center-to-center spacing of the array and θ is the angle of steer.

Figure 6A:
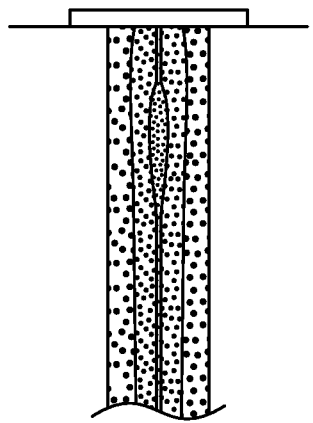
FIGS. 6A-6D illustrate different types of beam focusing in accordance with embodiments of the present disclosure.
Figure 6B:
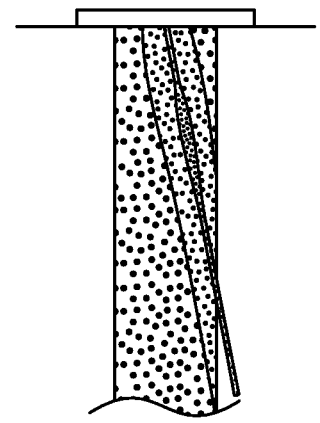
Figure 6C:
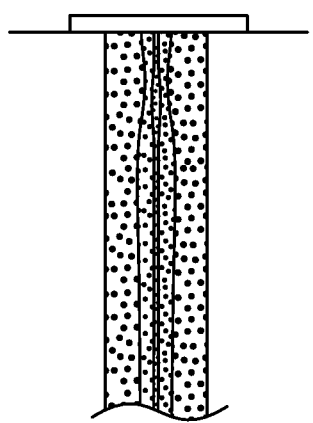
Figure 6D:
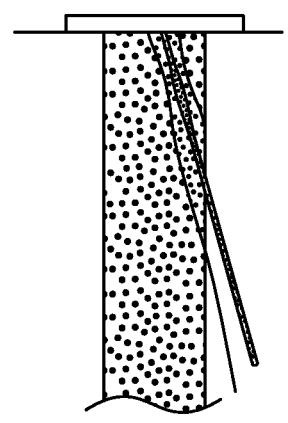

FIGS. 6A-6D illustrate different types of beam focusing in accordance with embodiments of the present disclosure. FIG. 6A illustrates an example without delay. The resulting ultrasonic beam is unfocused and the array in effect becomes focused at the near-field distance of the element. 6B illustrates an example of beam steering using an approximately linear delay decrease from left to right. FIG. 6C illustrates an example of depth focusing by using an approximately parabolic increase in delay moving outward from the center elements. Here, the focus is localized to a greater degree. FIG. 6D illustrates an example of beam steering with depth focusing using an approximately parabolic delay decrease from left to right.

Although ten elements are shown in FIG. 5 above, in practical implementation, the module may contain many more elements. Another technique which may be used with the modules of the present disclosure is electronic scanning. In electronic scanning a subset of the elements in the array are used to generate a focused beam. The beam may be translated across the module by actuating subsequent groups of elements.

Figure 7:
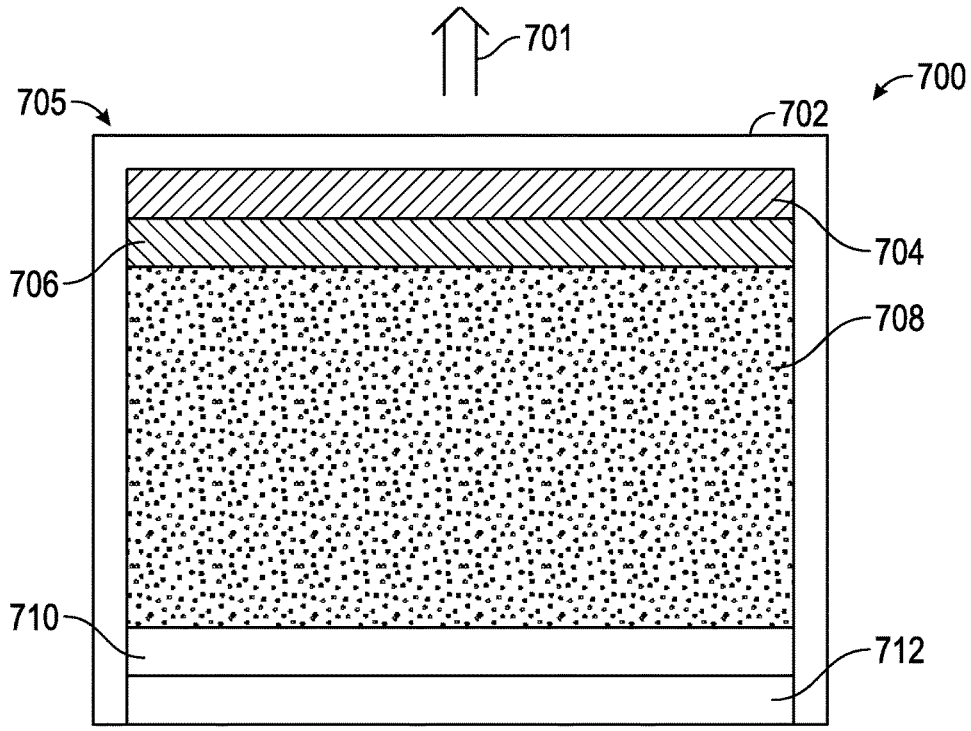
FIG. 7 shows a cross-sectional view of another self-contained convex linear phased array module in accordance with embodiments of the present disclosure.

FIG. 7 shows a cross-sectional view of another self-contained convex linear phased array module in accordance with embodiments of the present disclosure. Self-contained convex linear phased array module 700 is configured for installation with nominal acoustic transmission direction 701 aligned with a radius of the tool 10 and perpendicular to a longitudinal axis of the tool 10. Self-contained convex linear phased array module 700 includes a rigid shell 702 comprising an epoxy or other polymer. The outermost surface 705 of the shell 702 may be concentrically aligned with the longitudinal tool axis. Outermost surface 705 of the shell may remain uncovered, and as such may be exposed to the borehole 10 (including, e.g., being in contact with borehole fluid) while in operation. Although depicted as having a rectangular cross-section, rigid shell 702 may be formed, molded, or machined to any number of form factors, and include various shapes with irregular thicknesses. In one embodiment, the shell has six "sides" comprising five surfaces and one open side, but the shell may have more than six sides and more than five surfaces. In several embodiments, the shell 702 has only one open side.

In one implementation, the shell 702 is an alumina loaded epoxy, such as, for example, with the epoxy resin as the matrix and polycrystalline alumina ($Al_2O_3$) as the filler. Interior to the shell 702, an acoustic impedance matching layer 704 may be applied against the outermost surface 705 of the shell 702, with piezoelectric elements 706 as the next radial layer. The piezoelectric elements 706 and the shell 702 may be bonded to the impedance matching layer 704. The acoustic impedance matching layer 704 may be an alumina loaded epoxy with different characteristics than the shell 702 or another other environmentally appropriate impedance matching material. The acoustic impedance matching layer 704 may have a thickness of one-fourth of the desired wavelength from the piezoelectric element 706. Backing material 708, comprised of materials as described above, fills most of the volume of the shell. In some implementations, the "back"—that is, the interior side away from the borehole—is pressure compensated using a compensation fluid 710, such as oil, and sealed with an encapsulant 712, such as an epoxy. Upon being sealed, the module may be completely encapsulated. Circuitry for actuation of the elements 706 may be run through the backing layer or exit the shell via an opening at a surface other then the outermost surface 705, which may be appropriately sealed (see sealed boss 404, with respect to FIG. 4A above).

Thus, transmission may reach the borehole fluid via transmission through the outermost surface 705 which is in direct contact with the borehole fluid. The rigid shell provides exemplary acoustic coupling of the piezoelectric element to the borehole fluid. By avoiding additional coverings or acoustic windows (e.g., acoustic fluid) between the transducer and the borehole fluid, significant increases in resolution may be achieved. Additionally, by providing individual modules serving as the outermost surface of the tool, circumferential lamb waves on the outer surface of the acoustic tool are prevented.

Figure 8:
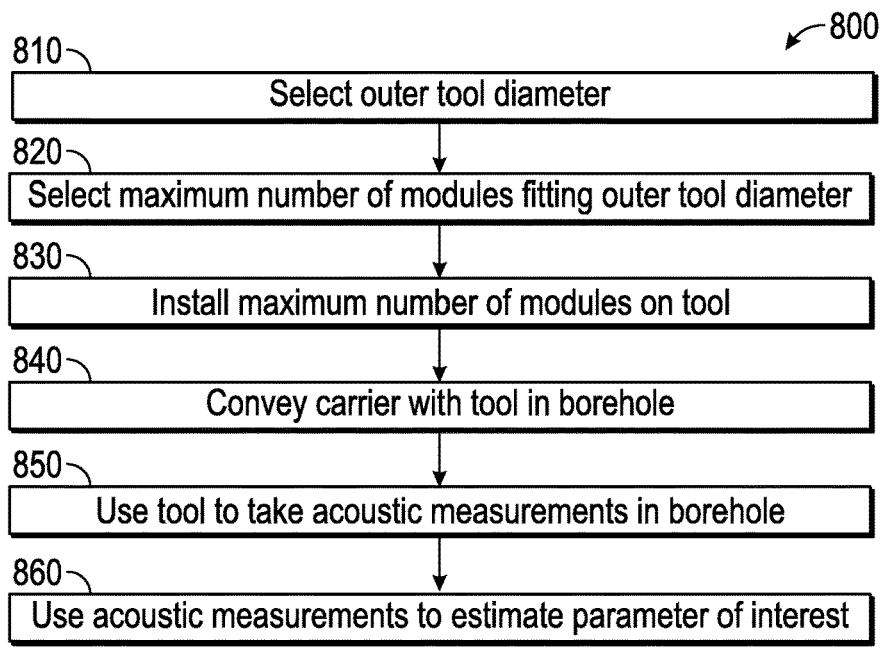
FIG. 8 illustrates methods for evaluating a formation intersected by a borehole in accordance with embodiments of the present disclosure.

FIG. 8 illustrates methods for evaluating a formation intersected by a borehole in accordance with embodiments of the present disclosure. Method 800 begins with optional step 810, selecting an outer tool diameter substantially the same as an inner diameter of the borehole. For example, for a 10-inch diameter borehole, an 8-inch diameter array section may be used with the tool. A tool having the outer tool diameter is chosen for configuration or fabricated. This portion of the tool may function similar to an excluder (e.g., excluding mud), resulting in a significant increase in signal amplitude. That is, because an attenuation coefficient is a function of the media, and the tool replaces a volume of borehole fluid having a high attenuation coefficient, the tool cross-section at the array operates to reduce the coefficient for the sensors. Optional step 820 comprises selecting a maximum number of self-contained convex linear phased array modules fitting the outer tool diameter for the plurality. In the example above, an 8-inch diameter sensor section may be outfitted with a segmented sensor array comprising six modules. At least one module is selected. Each of the at least one module comprises a rigid shell forming a compartment containing a piezoelectric component array.

For example, tool simulations may be carried out evaluating arrays containing varying numbers of the standard modules against dimensional constraints to determine the maximum number of self-contained convex linear phased array modules fitting the outer tool diameter. Each standard module may have standardized dimensions. The acoustic tool may be configured to have the outer tool diameter and to accept the maximum number of self-contained convex linear phased array modules. In this way, a standardized module may be employed on the largest number of tools configured for a wide variety of borehole sizes, while maintaining substantially continuous coverage of the borehole circumference. Optional step 830 comprises installing the plurality of self-contained convex linear phased array modules on the acoustic imaging tool.

At optional step 840, a carrier having the tool disposed thereon may be conveyed in the borehole. Step 850 comprises using the acoustic imaging tool to take acoustic measurements in the borehole. Step 850 may be carried out by transmitting a plurality of acoustic pulses from one or more of the modules, as described above, and generating a measurement signal with the one or more of the modules in response to receiving reflections resulting from the plurality of acoustic pulses.

Optional step 860 comprises using the acoustic measurements to estimate at least one parameter of interest. Step 860 may be carried out by processing acoustic measurements in accordance with known principles. For example, an envelope of the signal may be estimated by at least one processor, and at least one parameter of the borehole may be estimated using at least one arrival time of the acoustic signal envelope. A property of the earth formation may be estimated using the amplitude of at least one of the reflections. A stacked image of the borehole wall may be generated using the plurality of reflections. The plurality of acoustic pulses may be close enough together in time that the reflections of the pulses may overlap when returning to the module (or an array of modules). In some embodiments, the plurality of acoustic pulses may be spaced such that reflections from acoustic pulses at the beginning of the plurality of acoustic pulses may be arriving before the transmission of the plurality of acoustic pulses has finished.

The parameter of interest may be applied to a model. Further optional steps may include transmitting and/or displaying a representation of the model, the parameter of interest, or the evaluations. Other optional steps may include conducting further operations in the earth formation in dependence upon the estimation, the model, or the evaluations. Further operations may include at least one of: i) extending the borehole; ii) drilling additional boreholes in the formation; iii) performing seismic measurements on the formation; iv) performing borehole logging in the formation; v) installing casing in the borehole; vi) evaluating casing installed in the borehole; and vii) producing one or more hydrocarbons from the formation. This may be carried out by conducting further operations in dependence upon a model in which the estimation has been incorporated.

Borehole parameters estimated may include, but are not limited to, one of: (i) size, (ii) shape, (iii) acoustic reflection strength, (iv) acoustic contrast of borehole fluid versus the earth formation, and (v) geometry. The acoustic signal may be filtered before or during processing.

As would be known to those versed in the art and having benefit of the present disclosure, the amplitude of the events depends upon the acoustic impedance contrast between the fluid in the borehole and the earth formation. Accordingly, an image of the amplitudes of the events provides an indication of the acoustic impedance of the borehole wall. As the borehole fluid properties are relatively invariant over many meters or tens of meters of the depth of the borehole, the image of the amplitudes is also indicative of the velocity of the earth formation.

Based on travel-times and amplitudes of the detected arrivals, using known methods, it is then possible to determine one or more of the following: (i) a thickness of the casing, (ii) the acoustic impedance of the cement in proximity to the casing, (iii) a position and size of a void in the cement, and (iv) a position and size of a defect in the casing. The amplitude and transit time of the echo are detected by methods known in the art. See for example, U.S. Pat. No. 9,103,196 to Zhao et al, having the same assignee as the present disclosure and the contents of which are incorporated herein by reference.

When measurements are made in an MWD mode, the rotational speed of the transducer may be the same as the rotational speed of the drill collar. In some embodiments, however, the tool or portions thereof may be rotated independently of the drill collar, or held to substantially zero rotation through the use of independent rotational systems, as known in the art.

Herein, "information" may include raw data, processed data, analog signals, and digital signals. Estimation of the parameter may include the use of a model. In some embodiments, the model may include, but is not limited to, one or more of: (i) a mathematical equation, (ii) an algorithm, and so on. The at least one parameter of interest may include, but is not limited to, one or more of: (i) reflectance; (ii) transit time; (iii) an acoustic image of the borehole (e.g., geometry of the borehole); and so on.

In some aspects, this disclosure relates to estimating a parameter of interest related to a volume of an earth formation, such as, for example, an earth formation surrounding a borehole. The parameter of interest may be a physical characteristic of the volume, such as, for example, geometry.

The term "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. The term "processor" herein includes, but is not limited to, any device that transmits, receives, manipulates, converts, calculates, modulates, transposes, carries, stores or otherwise utilizes information. A processor refers to any circuitry performing the above, and may include a microprocessor, resident memory, and/or peripherals for executing programmed instructions, application specific integrated circuits (ASICs), field programmable gate arrays (FPGAs), or any other circuitry configured to execute logic to perform methods as described herein. The term "information" as used above includes any form of information (Analog, digital, EM, printed, etc.). In one example embodiment, a processor may include a microprocessor, resident memory, and peripherals for executing programmed instructions.

In several non-limiting aspects of the disclosure, a processor includes a computer that executes programmed instructions for performing various methods. These instructions may provide for equipment operation, control, data collection and analysis and other functions in addition to the functions described in this disclosure, and may be stored on a non-transitory machine-readable medium accessible to the processor. The non-transitory machine-readable medium may include ROMs, EPROMs, EAROMs, Flash Memories, Optical disks, and Hard disks. Thus, configuration of the processor may include operative connection with resident memory and peripherals for executing programmed instructions. The processor may execute instructions stored in computer memory accessible to the processor, or may alternatively employ logic implemented as field-programmable gate arrays ('FPGAs'), application-specific integrated circuits ('ASICs'), other combinatorial or sequential logic hardware, and so on. As noted above, the processing may be done downhole or at the surface, by using one or more processors. In addition, results of the processing, such as an image of an acoustic property or parameter values for a parameter of interest associated with a particular volume of interest (e.g., associated with a particular borehole depth), can be stored on a suitable medium.

The term "substantially real-time" as applied to methods of the present disclosure refers to an action performed (e.g., estimation, modeling, and so on) while the sensor is still downhole, after the generation of the information and prior to movement of the sensor an appreciable distance within the context of evaluating the borehole or formation at an associated resolution, such as, for example, a distance of 100 meters, 50 meters, 25 meters, 10 meters, or less; and may be defined as estimation of the parameter of interest or production of the current iteration of a model within 15 minutes of generating the information, within 10 minutes of generation, within 5 minutes of generation, within 3 minutes of generation, within 2 minutes of generation, within 1 minute of generation, or less. The term "substantially continuous" as applied to measurement in accordance with embodiments of the present disclosure means that no gaps exist within the measurement corresponding to a circumference of the borehole at a particular borehole depth.

The term "substantially continuous coverage" as applied to methods of the present disclosure refers to correspondence between a linear measurement of the borehole circumference and aggregate linear sensor dimensions, such as, for example, a ratio of borehole to sensor length of 5 to 4, 6 to 5, 7 to 6, 8 to 7, 9 to 8, 10 to 9, 100 to 99, or less.

The term "substantially the same" as applied in the context of diameter refers to diameters negating the effects of standoff between the module and the borehole wall, such that the effects are negligible, such as, for example, differences in diameter of less than 25 percent, less than 10 percent, less than 5 percent, less than 3 percent, less than 2 percent, less than 1 percent, less than 0.5 percent, and so on, down to and including no difference. Other examples based on borehole and tool measurements may include:

| Borehole Diameter (Inches) | Tool Diameter at Segment Array (Inches) |
|---|---|
| 8.0-8.5 | 6.5 |
| 8.5-9.5 | 7 |
| 9.5-10.75 | 9.75 |
| 11.75-12.25 | 10.25 |
| 12.25-12.5 | 10.75 |

The term "self-contained" as applied to methods of the present disclosure refers to being characteristic of a segmented or modularized approach, including each segment being mechanically separate, with individual wiring and encapsulation, allowing addition of additional modules through simple installation and configuration. Configuration may be carried out through the modification of a configuration file (including, for example, automatic configuration, e.g., plug-and-play, via automatic detection), jumper blocks, dual in-line package (DIP) switches, and the like.

The term "rigid shell" as applied to methods of the present disclosure means the distance between any two given points of the shell remains substantially constant in time regardless of external forces exerted on it during borehole operations. The terms "substantially constant" in the context of the rigid shell means that changes in distance are constrained to less than 1 percent, less than 0.5 percent, less than 0.1 percent, and so on down to and including zero distance change.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation properties may be recorded on a suitable medium and used for subsequent processing upon retrieval of the BHA. The determined formation properties may further be telemetered uphole for display and analysis.

While the foregoing disclosure is directed to the one mode embodiments of the disclosure, various modifications will be apparent to those skilled in the art. It is intended that all variations be embraced by the foregoing disclosure.

We claim:

1. A method for estimating a value of a parameter of interest of earth formations intersected by a borehole, the method comprising:
    selecting a first outer tool diameter substantially the same as a first inner diameter of a first borehole in a first earth formation;
    selecting a first maximum number of self-contained convex linear phased array modules fitting the first outer tool diameter, wherein an acoustic imaging tool is configured to have the first outer tool diameter and to accept the first maximum number of self-contained convex linear phased array modules wherein the acoustic imaging tool includes the first maximum number of self-contained convex linear phased array modules circumferentially arrayed about a portion of the acoustic imaging tool;
    installing the first maximum number of self-contained convex linear phased array modules on the acoustic imaging tool, each of the self-contained convex linear phased array modules comprising a rigid shell forming a compartment containing a piezoelectric component array;
    conveying the acoustic imaging tool in the first borehole;
    using the acoustic imaging tool to take first acoustic measurements from the first borehole;
    using the first acoustic measurements to estimate at least one first parameter of interest for the first borehole;
    selecting a second outer tool diameter substantially the same as a second inner diameter of a second borehole in a second earth formation;
    selecting a second maximum number of self-contained convex linear phased array modules fitting the second outer tool diameter, wherein the acoustic imaging tool is configured to have the second outer tool diameter and to accept the second maximum number of self-contained convex linear phased array modules wherein the acoustic imaging tool includes the second maximum number of self-contained convex linear phased array modules circumferentially arrayed about the portion of the acoustic imaging tool;
    installing the second maximum number of self-contained convex linear phased array modules on the acoustic imaging tool, each of the self-contained convex linear phased array modules comprising a rigid shell forming a compartment containing a piezoelectric component array;
    conveying the acoustic imaging tool in the second borehole;
    using the acoustic imaging tool to take second acoustic measurements from the second borehole; and
    using the second acoustic measurements to estimate at least one parameter of interest for the second borehole.

2. The method of claim 1 comprising individually removing one selected self-contained convex linear phased array module from the acoustic imaging tool.

3. The method of claim 1 comprising using each of the first maximum number of self-contained convex linear phased array modules and the second maximum number of self-contained convex linear phased array modules to make a continuous measurement around the circumference of the acoustic imaging tool.

4. The method of claim 1 comprising bolting the second maximum number of self-contained convex linear phased array modules to the acoustic imaging tool.

5. The method of claim 1 wherein the acoustic imaging tool is controlled by at least one processor configured to be switchable between a plurality of modes, and wherein each mode of the plurality of modes corresponds to a particular number of self-contained convex linear phased array modules being in the plurality of self-contained convex linear phased array modules, the method further comprising switching the at least one processor into a mode of the plurality of modes corresponding to the first maximum number for the first acoustic measurements and the second maximum number for the second acoustic measurements.

6. The method of claim 1 wherein each convex linear phased array module of the plurality is encapsulated.

7. The method of claim 6 wherein each convex linear phased array module of the plurality is encapsulated at least in part by the rigid shell.

8. The method of claim 7 wherein a borehole fluid fills the borehole and wherein at least a portion of the rigid shell is in contact with the borehole fluid while using the acoustic imaging tool to take the first acoustic measurements and the second acoustic measurements.

9. The method of claim 1 wherein each convex linear phased array module comprises a sealed connective protuberance, and each piezoelectric component array is electrically connected to the acoustic imaging tool via the sealed connective protuberance.

10. The method of claim 1 wherein each piezoelectric component array comprises a plurality of piezoelectric elements, the method comprising initiating transmission from each piezoelectric element of the plurality of piezoelectric elements in a selected convex linear phased array module at a time different than other times corresponding to transmission by other piezoelectric elements of the plurality of piezoelectric elements.

11. The method of claim 1 wherein the at least one convex linear phased array module is configured to prevent propagation of circumferential lamb waves on the linear phased array module.

* * * * *